March 31, 1970     L. F. A. MENARD     3,503,254

APPARATUS FOR MEASURING, IN SITU, STRESSES IN A MATERIAL

Filed Sept. 22, 1967     3 Sheets-Sheet 1

INVENTOR:
LOUIS F. A. MENARD

By Breitenfeld & Levine

ATTORNEYS

March 31, 1970     L. F. A. MENARD     3,503,254
APPARATUS FOR MEASURING, IN SITU, STRESSES IN A MATERIAL
Filed Sept. 22, 1967     3 Sheets-Sheet 2
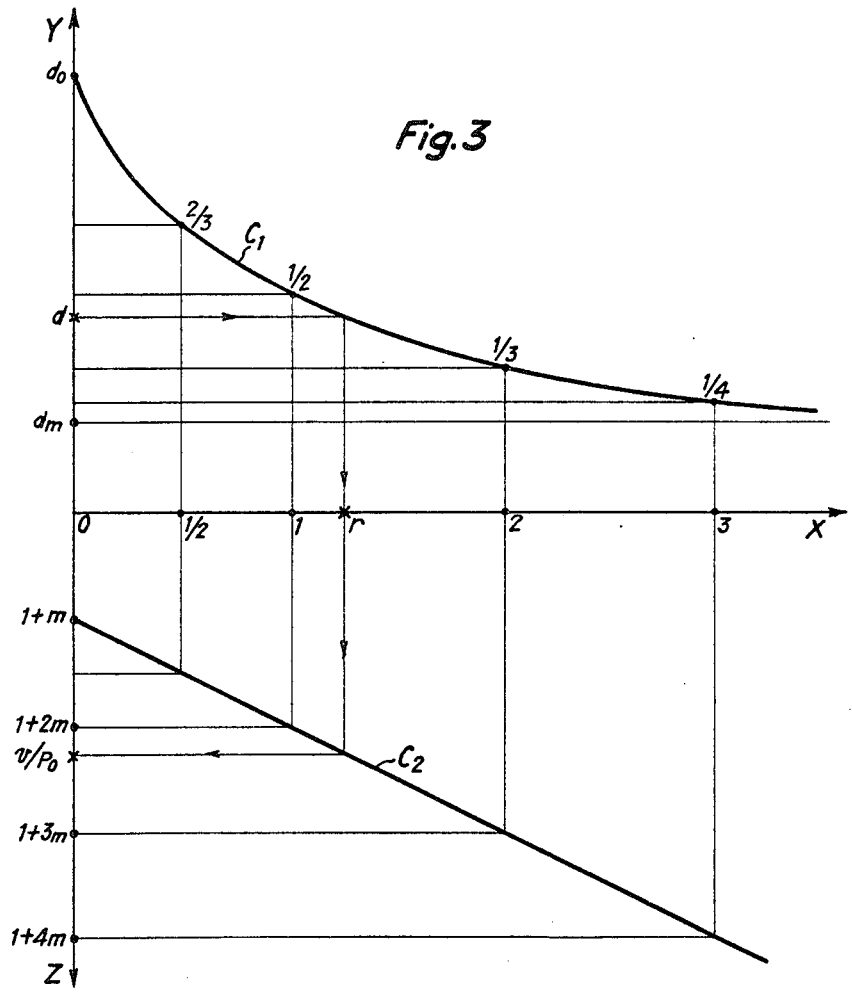

March 31, 1970  L. F. A. MENARD  3,503,254
APPARATUS FOR MEASURING, IN SITU, STRESSES IN A MATERIAL
Filed Sept. 22, 1967  3 Sheets-Sheet 3
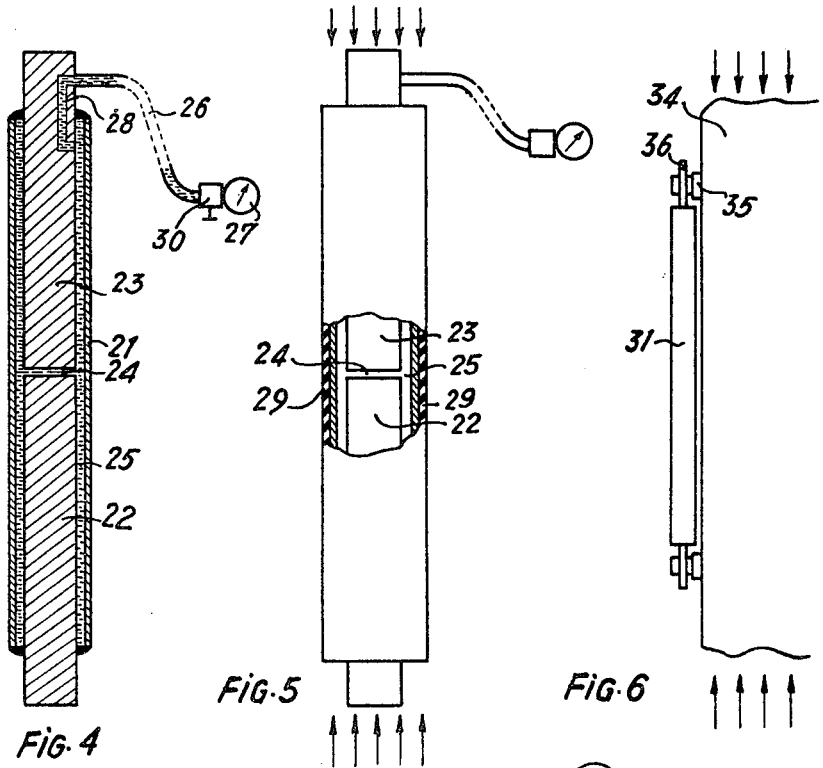
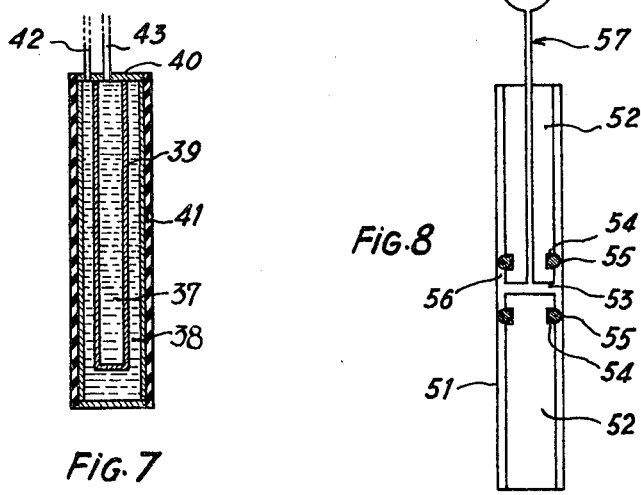
INVENTOR:
LOUIS F. A. MENARD
BY
Breitenfeld & Levine
ATTORNEYS : 3,503,254
Patented Mar. 31, 1970

3,503,254
APPARATUS FOR MEASURING, IN SITU, STRESSES IN A MATERIAL
Louis François Auguste Menard, 54 Avenue de la Motte Picquet, Paris 15, France
Filed Sept. 22, 1967, Ser. No. 669,940
Claims priority, application France, Sept. 23, 1966, 77,497; July 31, 1967, 116,325
Int. Cl. G01b 5/30; G01l 5/00
U.S. Cl. 73—88    8 Claims

ABSTRACT OF THE DISCLOSURE

Apparatus for the in-situ measurement of the modulus of deformation and stresses, in a material (e.g. concrete) comprises a tube embedded in the material and having inner and outer walls defining therebetween an annular fluid chamber, the chamber being connected by ducting to a fluid-pressure measuring device outside the material. For measuring the modulus of deformation, the inner wall defines an inner fluid chamber to which pressure-measuring and pressure-varying means are connected.

---

The present invention relates to a process of, and apparatus for measuring, in situ, the modulus of deformation and stresses (or constraints) in a material.

With known processes and apparatus for measuring stresses existing in a material, the value of the stress is obtained only via a relationship which introduces the modulus of deformation of the material being studied. Indeed, means for measuring stress measure only deformations, and even if the deformations transmitted to certain types of apparatus are transformed into values of pressure by means of an internal mechanical and hydraulic system having its own modulus of deformation and if there is equivalence between the modulus of the material and the modulus of the apparatus, so that the reading of pressure can be equated to the measured stress, for example in the case of a flat screw-jack, it still applies that the modulus of the material plays an essential role and must be measured.

Measurements of stress as such are realised at the heart of the material when the measurements of the modulus of deformation, which are necessary for the exploitation of the results of stress measurement, are realised with other methods on a specimen of this material.

One inconvenience of these techniques is that for certain materials, notably concrete, the values of the modulus of deformation are different from one point to another and change with time, particularly during the period of hardening. It is the same, a fortiori, for rock and soil of which it is virtually impossible to obtain the modulus of deformation without effecting some measurements of this modulus in the immediate vicinity of the point considered in the material.

The present invention concerns apparatus for permitting the measurement of the modulus of deformation of a material at the precise position at which the stresses in the material are measured, and under the same conditions.

The fact that measurement of the modulus of deformation is effected under the same conditions as the measurement of stresses considerably increases the accuracy of the results.

Among the other advantages of measuring, in situ, the modulus of the material, the following points can be mentioned, in the case in which the material is concrete:

The measurement permits elimination of errors introduced at the time of formation of the cubes or cylinders for experimental investigation (surface effects, granulometric variations, curing etc.), the investigation is carried out on the concrete actually incorporated in the very structure of the piece of work.

It permits one to follow the progress of hardening of the concrete and to modify certain site operations in dependence on the results obtained (e.g. removal from the cast, or placing under prestress).

It provides a precise basis for evaluating the quality of the material as a function of Cahier des Charges data.

Such a process of simultaneously measuring deformation (measurement of a stress is in effect a measurement of deformation) and the modulus of deformation of a material, in-situ, is capable of very varied applications, for example:

The study of the evolution of stresses in the rock surrounding a cavity (chamber, tunnel) after the placing in position of casing at the time of cutting an adjacent gallery, or the placing in position of anchorages.

The control of placing under load casing of reinforced concrete in a tunnel, or a mass of rock under a dam etc.

The study of the evolution of stresses in beams, posts etc. and all reinforced concrete structures under static or dynamic load.

The study of the influence of circulation on the foundation soils of roads and on the constituents of dikes (consolidated soil, bituminous concrete).

For measuring in situ stresses and the modulus of deformation of a material, the invention comprises sealing in the material a cell having a cylindrical outer wall of calibrated diameter and of a metal giving to the wall a precisely known elastic resistance, the cell being closed and containing a hydraulic fluid, measuring the reduction of the section of the cell associated with the value of stresses existing around the cell, creating a hydraulic pressure within the cell in order to effect an increase of the section of the cell and measuring this increase which is of greater or less magnitude depending upon the value of the modulus of deformation of the material.

The measurement of variations in the section of the cell is the more delicate as these variations are at most of the order of a micron and the accuracy sought approaches one hundredth of a micron.

One known means for measuring a variation in the section of a cell is to read on a capillary volumeter the corresponding variations of volume, but this method demands considerable care and is not convenient for current use.

According to one feature of the invention, the measurement of variation of volume or of the section of the cell is transformed into the measurement of a differential pressure.

In order to do this, the cell is preferably provided with two fluid chambers which are independent of, and fluid-tight with respect to, one another, that is to say an inner chamber and a peripheral chamber disposed around the inner chamber, and the value of the pressure in one or other of the chambers is varied and the value of the corresponding pressure in the adjacent chamber is measured. Under these conditions, the variations of volume or of section of the cell are indicated by the variations of the difference between the pressures existing in the chambers.

More precisely, in an active phase of the process according to the invention, the pressure in the inner chamber is varied and the corresponding variation of pressure in the peripheral chamber is registered, thus determining the modulus of deformation of the material. In another passive phase of the process, the variations of pressure in the peripheral chamber due to the effect of the field of stress are simply registered.

The cell is therefore connected to a device comprising a manometer connected by a fluid duct or other pressure transmission means to the inner chamber and a manometer connected by a fluid duct or other pressure transmission means to the annular chamber.

Suitable branches can connect the said fluid ducts with fluid sources and micro-jacks are provided on these ducts for affecting the fluid pressure in the corresponding chamber of the cell.

Such apparatus can be simplified in the case in which only a passive measurement of stresses in the material is to be made, without seeking to measure the corresponding modulus of elasticity.

This simplified embodiment of the apparatus has the following characteristics:

The measuring cell consists of a cylindrical hollow metallic tube closed at its two ends, this tube constituting a single fluid chamber which is connected by suitable ducting to a device for measuring the pressure in the chamber.

The fluid chamber is largely filled by a core formed of two separate parts which do not touch the cylindrical wall of the tube and which are each fixed to one end of the tube.

The metallic tube is fixed at each end on the periphery of a core introduced into the tube.

The space between the opposing faces of the two cores is of the order of millimeters, in particular between 0.5 and 3 mm.

The cores are formed of a material having a very low coefficient of thermal expansion with respect to the coefficient of thermal expansion of the material of which the tube is formed, the cores being for example of "Invar" and the tube being of stainless steel.

A cell thus formed has the great advantage of being very insensitive to temperature variation in the sense that the measurements of pressure, which indicate the stresses, are little effected by the temperature variations of the medium in which the cell is located, the presence of the core in the chamber and the choice of its material permitting compensation for variations in the volume of the fluid, bearing in mind the nature of the fluid (generally oil) and the respective volumes of the core and of the space open to the fluid.

In order to use the cell as an extensometer sensitive only to the forces which act along the axis of the cell, it is sufficient to sheathe the tube in a material for absorbing radially directed stresses, for example a sheath of rubber.

The invention thus provides an extensometer element sensitive to axial stresses only which can be used for measuring the stresses existing in a material and acting in a given direction and which can be combined with other identical extensometers disposed parallel or in directions perpendicular to that of the first one, or in directions oblique to one another for effecting all types of measurements.

In one embodiment, the fluid chamber is defined within the measuring cell by two annular seals spaced apart by four to ten mm. each fixed on one of the two separate parts forming the inner core, which can be easily grooved within the closed cylindrical tube.

The cell thus formed has the advantage of being substantially insensitive to forces acting perpendicular to the axis of the cell and of having a longitudinal sensitivity which is clearly greater. It thus constitutes an elementary extensometer sensitive only to axial stresses, permitting measurement of the stresses existing in a material only in any given direction.

The description which follows of apparatus according to the invention and adapted for concrete and resistant rock will make clear the other features and advantages of this apparatus:

FIGURE 3 shows a graph for use in interpreting the data provided by the apparatus of FIGURES 1 and 2;

FIGURE 4 is a section through a measuring apparatus in accordance with a second embodiment of the invention;

FIGURE 5 is a partial section of the apparatus of FIGURE 4 in the case in which the cell is sheathed in a rubber tube;

FIGURE 6 is a schematic illustration of the cell of the apparatus of FIGURE 4 for measuring the stress in a material;

FIGURE 7 shows a modification of the embodiment of the cell; and

FIGURE 8 is a section of the modification of FIGURE 7.

Figure 1:
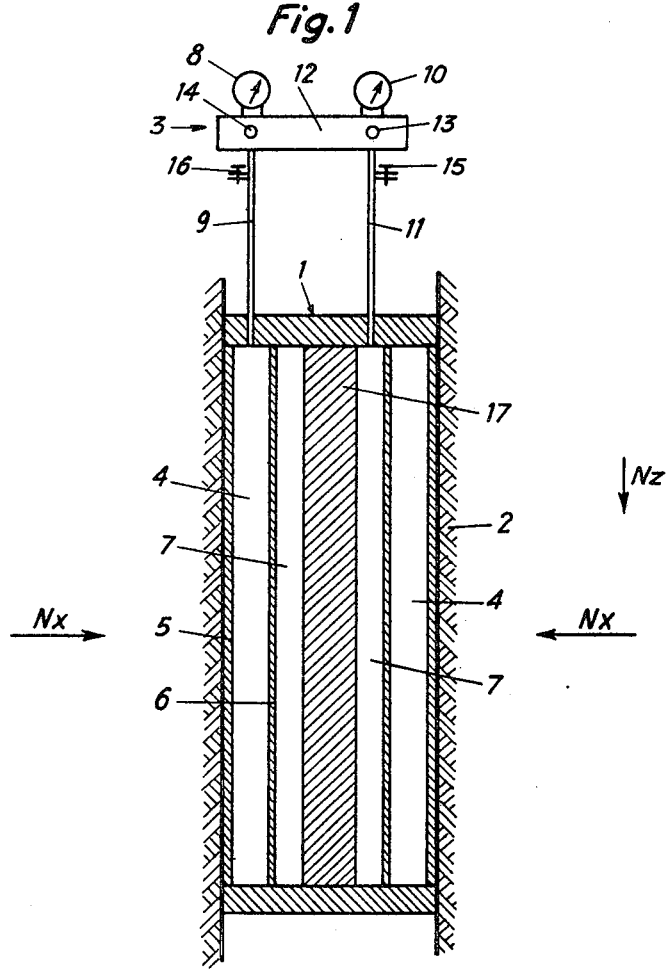
FIGURE 1 is an axial section of the cell of the apparatus according to a first embodiment of the invention, the cell being introduced into the material whose characteristics are to be measured, and connected to a measuring device.

The apparatus of FIGURE 1 comprises a cell indicated generally by the reference 1 introduced in a material 2 of which the characteristics are to be measured and connected by ducting to a measuring unit indicated generally by the reference 3.

The cell 1 externally is of cylindrical shape; in contrast to know cells which are also cylindrical but which are in the shape of a flat disc, the cell of the present invention is of elongated form which permits it to be placed easily in the material without removal of a large mass of the latter, thus limiting the disturbance of the conditions existing in the material by placing the cell in position.

In contrast to know apparatus in which the exterior of the tube is only an envelope of rubber or copper of which the bare end has a water-tight connection to the system for transmitting pressure, the external wall 5 of the cell of the present invention is made of a metal having an elastic resistance precisely known, the wall being perfectly elastic and of known elasticity. Moreover, the diameter of the wall is calibrated.

Thus it is possible to calibrate the internal compressibility of the cell with a high degree of precision, by measurements taken when the cell is empty.

Given that the measurements of volume which are to be taken in the material bring in this compressibility of the cell, it is very advantageous to be able to know that part due to this compressibility in the measurements effected in the material.

In practice, it is convenient to use, as the metal for the wall of the cell, stainless steel.

Experiment shows that it is advantageous to arrange a ratio of at least five between the length and the diameter of the cell.

It is to be noted that the influence of the ratio of the length to the diameter varies according to the value of the modulus of the apparatus relative to the modulus of deformation of the material, but that this variation is only significant in the case of the apparatus according to the invention by reason of the fact that this apparatus can be active or passive.

The apparatus is active when it serves for the measurement of the modulus of deformation of the material, since in this case the variation of pressure in the annular chamber of the cell is created by variation of the pressure which is impressed in the chamber surrounded by the internal partition. The apparatus is passive when the variation of pressure in the annular chamber of the cell is due to variation in the field of stress appearing in the material.

Figure 2:
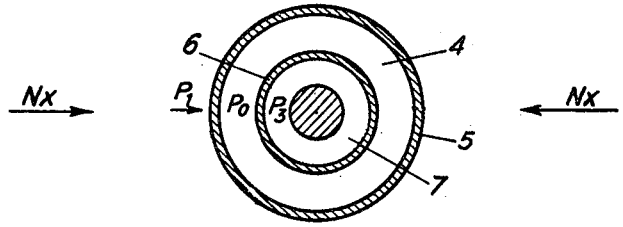
FIGURE 2 is a section of the cell of FIGURE 1 on a plane perpendicular to the axis of the cell.

As is seen in FIGURE 2, the annular chamber 4 of the cell is defined by an external cylinderical wall 5 and by an internal cylindrical wall 6, both of which are of metal; the internal cylindrical wall 6 surrounding a chamber 7 which is independent of the chamber 4. The two chambers are fluid-tight and are each connected to a manometer by suitable ducting.

FIGURE 1 thus shows, in the measuring device 3, a manometer 8 connected by a duct 9 with the interior of the annular chamber 4 and a manometer 10 connected by a duct 11 with the interior of the chamber 7.

In the example under consideration, the two manometers are mounted on a support 12 which is also provided with two micro-screw jacks 13 and 14 each mounted to affect the value of pressure in one chamber.

Thus, the micro-jack 13 is arranged to affect the pressure in chamber 7 through the duct 11, whilst the micro-jack 14 is arranged to affect the value of pressure in the chamber 4 through the duct 9.

The ducts 9 and 11 should be of a length sufficient for the measuring device 3 to be easily accessible to the operator when the cell 1 is immersed in the material in which the stress is to be measured. This length is preferably at least 50 cm. and can be as much as 100 cm. if necessary. In the latter case however, for reasons of relative sensitivity, cells of large diameter are used, of the order of about 50 mm. to 100 mm.

In each case, the ducting should have a very small internal diameter to avoid the influence of temperature variation on the measurements.

Couplings 15 and 16 can be mounted on branch ducts for supplying them with fluid from a suitable source not shown in FIGURE 1.

The fluid with which the chambers and the ducting is filled is advantageously an oil, and the filling is effected at the time of manufacture so that the apparatus is ready for use.

In practice, the external and internal walls 5 and 6 of the cell can be provided by two tubes coaxially fixed around a central core 17. These tubes are machine-finished to a high degree of accuracy so that their thickness and their distance from one another are exactly one hundredth of a mm. As has been said above, these tubes are fixed around the core in such a way as to form two independent and fluid-tight chambers.

Such an apparatus constitutes a combination of a pressure-measuring apparatus for measuring the modulus and an apparatus for measuring stress; the two coaxial cylindrical chambers can be subjected on the one hand to the field of stress of the material and on the other hand to the internal pressures measured or supplied by the manometric assembly at the surface.

The putting in place of the cell, of which the diameter can vary from about 20 to 100 mm. according to the conditions of the experiment (more particularly of the experiment and the nature of the material) is effected by introducing the cell into a corresponding boring previously formed in the material, the cell being sealed into the boring with a grout or, as is possible in the case of concrete for example, by introduction of the cell into the material at the time of casting the latter.

The sealing of the cell can be effected by injecting a mixture of fine sand and cement, or synthetic resin; the latter solution has the advantage of ensuring an actual gluing of the cell in the center and of rendering the cell sensitive to the stress of traction which can exist in the center. It is expedient in all these cases that the thickness of the cement or resin coating should be limited, preferably below about 5 mm., since a greater thickness could distort the value of the modulus of deformation.

It is advantageous to provide, in the axis of the cell, a channel facilitating the introduction of the grout by injection.

In this respect, it should be noted that the progress of the injection can be controlled by reading the manometers during the operation.

Once the cell has been put in position and after verifying the values of the pressures read on the manometers which should be stable and equal to a predetermined value, one can proceed to the active phase of measuring the modulus of deformation of the material.

This measurement is effected by increasing, preferably by successive steps, the pressure $p_3$ in the chamber 7 surrounded by the cylindrical wall 6, by the means of the micro-jack 13; the value of the pressure $p_3$ is read on the manometer 10 and the corresponding value $p_0$ of the pressure in the annular cylindrical chamber 4 is read on the manometer 8.

The value of the modulus of the material is derived from the value of the ratio $d$ of the variation of $p_3$ to the corresponding variation of $p_0$.

If the material has a zero modulus of deformation (in the case of air or water), $d$ has a limiting value $d_0$ which characterizes the apparatus when empty; the more rigid the material, the more $d$ approaches a value $d_m$ corresponding to an infinite value of the modulus of deformation.

In FIGURE 3 of the accompanying drawings, the curve $C_1$ permits deduction of the value of the ratio $r=D/D_0$ (D being the modulus of deformation of the material and $D_0$ the equivalent modulus of the apparatus) of the value of the ratio of pressures $d$, the values of $d$ being carried on the axis OY and the values of $r$ being carried on the axis OX.

From the determination of the modulus of deformation D of the material, it is possible to deduce the modulus of elasticity E of the material, these two quantities being related by the expression $$D=\frac{E}{1+s}$$

where $s$ is Poisson's ratio for the material.

In a second stage of the measurement, one proceeds to the passive measurement of stress in the material by simply reading or registering $p_0$.

The value $v$ of the mean stress is related to the value of $p_0$ by an expression which introduces the modulus of deformation D of the material. Indeed, a linear relationship exists which is shown in FIGURE 3 by the curve $C_2$ between the value of the ratio $r$ and the value of the ratio $v/p_0$, the values of $v/p_0$ being carried on the axis OZ.

Starting from the measurement of $p_0$ and $p_3$, one calculates the value $d$, and starting from the value $d$, by means of the curves $C_1$ and $C_2$, one determines the corresponding value of the ratio $v/p_0$, and by experimental determination of $p_0$ one obtains the value of the mean stress $v$.

The ratios 2/3, 1/2, 1/3, 1/4 carried on the curve $C_1$ are particular values of ratio $$\left(\frac{d-d_m}{d_0-d_m}\right)$$

The values 1/2, 1, 2 and 3 carried on the axis OX are the corresponding values of the ratio $D/D_0$ and the values $1+2m$, $1+3m$, $1+4m$ are the values of the ratio $v/p_0$ which correspond respectively to the values 1, 2 and 3 of the ratio $r$, $m$ being a mechanical characteristic of the apparatus (coefficient of transmission). This coefficient can be calculated in particular from the ratio of the variation of the peripheral pressure $p_0$ to the variation of the internal pressure $p_3$, when the peripheral pressure is varied by means of the micro-jack 14.

The measurement of stress can also be made, in an active manner, by allowing the apparatus to undergo deformation and suppression due to the field of stress in the material, whence there results an increase of the peripheral pressure $p_0$ from the initial value of this pressure, and by acting then on the internal pressure $p_3$ in a manner to bring back $p_0$ to its initial value.

The mean stress measured is a linear function of the three principle stresses $N_x$, $N_y$ and $N_z$ (FIGURES 1 and 2). Knowledge of the mean stress is sufficient in numerous cases. If one wishes to measure each of the principle stresses, three cells are used which are placed at the corners of a tri-rectangular dihedral. It is also possible to use cells at differentiated sectors permitting annulment of the action of one of the stresses.

The apparatus described above is of the type in which the cell comprises two chambers.

For certain applications, the invention permits the use of a more simple cell having a single chamber connected to a measuring unit comprising a manometer and a micro-jack.

Thus, the cell shown in FIGURE 4 consists of a tube of stainless steel 21 containing two cores 22 and 23, for example and preferably of "Invar" or a similar material, disposed longitudinally of one another with a small gap 24 therebetween. At each extremity, the tube is fixed to one core on the periphery of the latter, by welding. Some oil has been introduced by any suitable means into the chamber 25 defined by the tube 21 already filled largely by the cores, and this oil also fills a duct 26 connected at one end to the chamber and at its other end to a manometer 27. In order to reduce the volume of oil in the manometer, it is advantageous to arrange some filler balls or the like, for example of glass or plastic material, in the internal space of the manometer which is accessible to oil, that is to say in the pilotage chamber of the manometer. Communication between the duct 26 and the chamber of tube 21 is effected for example by means of a passage 28 in one of the cores. It is to be understood that the structure of the parts of the extremity of the tube can comprise other pieces over and above the tube and the cores.

The cell of FIGURE 5 is identical to that of FIGURE 4 except that a sheath of rubber 29 is disposed around the tube in such a way that the cell is sensitive only to axial forces whose direction is shown by the arrows.

It is to be noted that a jack 30 can be mounted on the ducting 26 or can be integral with the manometer 27 for controlling the apparatus.

In use, the cell is embedded in the material of which one wishes to measure the stresses, concrete for example, or it is fixed on the material at the exterior of the latter. FIGURE 6 shows schematically one such cell 31 fixed by its two axial ends 32 and 33 to a structure 34, for example a structure in concrete or in metal in which one wishes to measure the stresses. The rigid coupling of the cell to the structure can comprise parts fixed by welding or by adhesive, for example plates 35 adhering to the structure and rigid with straps 36 fixed to the axial ends of the cell.

FIGURE 7 shows a modification of the cell in which the cell comprises an inner chamber 37 surrounded by a peripheral chamber 38 as in the first-described embodiment, the separating wall 39 between the two chambers being fixed only at one axial end 40 of the cell. In addition, the cell is covered by a sheath of rubber 41 and it is connected to a pressure measuring device not shown, and is provided with two ducts 42 and 43 which connect the two chambers of this device, which is as described above. In this case, the apparatus can serve to measure the stresses acting along the axis of the cell.

The cell shown in FIGURE 8 consists of a tube of stainless steel 51 containing two cores 52 of "Invar" or similar material, disposed longitudinally of one another with a small gap 53 therebetween. The tube is fixed to each extremity by welding or swaging on the periphery of this core. On each core is a groove 54, the grooves being spaced apart after assembly by a distance of the order of 5 mm., in each of which an annular seal 55 is placed. Some oil or other suitable liquid is introduced by any appropriate means into the chamber 56 (comprising the separating space 53) defined by the tube 51 already containing the cores and the two annular seals 55; this oil also fills a duct 57 connected to one extremity of the chamber through one of the cores and at its other extremity to a manometer 58. The volume of oil or other liquid can be reduced as described in the first embodiment. A screw-jack can also be mounted on the ducting 57.

The use of this cell is similar in principle to that described in the first embodiment, except with regard to the sheath of rubber which is no longer used.

I claim:
1. Apparatus for the in-situ measurement of stresses in a material, comprising:
   a cell including a hollow cylindrical metallic tube closed at its two ends,
   two cores disposed longitudinally of each other within said tube, one of said cores being fixed to one end of said tube and the other of said cores being fixed to the other end of said tube, said cores being adapted to receive stress within said material and transmit said stress to said tube, said cores being out of contact with the wall of said tube and being spaced from each other by a distance of between 0.5 and 3 mm., to form a chamber with said tube said cores being formed of a material having a coefficient of thermal expansion lower than that of the metal of which said tube is formed, and said cores filling most of the volume of said tube,
   pressure measuring means, and
   pressure transmitting means connecting said chamber with said pressure measuring means so that the latter measures the fluid pressure within said chamber.

2. Apparatus according to claim 1 in which the said transmission means is a fluid-flow conduit opening into said chamber.

3. Apparatus according to claim 1 in which the cores are of "Invar" and the cylindrical wall is of stainless steel.

4. Apparatus according to claim 1 further comprising two seals, each mounted on the periphery of a respective one of said cores and cooperating with the said cylindrical wall to define the fluid chamber and to prevent the passage of fluid between the seals and said cylindrical wall.

5. Apparatus according to claim 4 in which the said seals are spaced from each other by a distance of 4 to 10 mm.

6. Apparatus according to claim 6 in which the said pressure transmission means is a fluid-flow conduit which traverses one of the cores to open between the said seals.

7. Apparatus according to claim 1 further comprising a sheath of stress-absorbing material surrounding said cylindrical wall.

8. Apparatus according to claim 1 in which the said cylindrical wall has a length at least equal to five times the diameter of the tube.

References Cited

UNITED STATES PATENTS

| | | | |
|---|---|---|---|
| 2,087,494 | 7/1937 | Annin | 73—407 |
| 2,037,949 | 4/1936 | Tate | 73—31 |

FOREIGN PATENTS

| | | |
|---|---|---|
| 857,222 | 12/1960 | Great Britain. |
| 268,557 | 5/1950 | Switzerland. |
| 335,564 | 2/1959 | Switzerland. |
| 778,590 | 6/1957 | Great Britain. |

RICHARD C. QUEISSER, Primary Examiner

J. WHALEN, Assistant Examiner

U.S. Cl. X.R.

73—141, 388